United States Patent Office 3,530,170
Patented Sept. 22, 1970

3,530,170
SELECTED 2-ACYL-A-NOR-5α-ANDROSTANE DERIVATIVES
Richard M. Scribner, Wilmington, Del., assignor to E. I. du Pont de Nemours and Company, Wilmington, Del., a corporation of Delaware
No Drawing. Continuation-in-part of application Ser. No. 499,016, Oct. 20, 1965. This application Sept. 4, 1968, Ser. No. 757,502
Int. Cl. C07c 49/26, 49/76, 61/14
U.S. Cl. 260—488                    10 Claims

ABSTRACT OF THE DISCLOSURE

Described and claimed are the A-nor-5α-androstane derivatives of the formulas

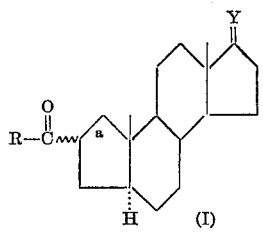

wherein Y is =O or the group

$$\underset{-R^1}{\overset{OH}{|}}$$

$R^1$ being $CH_3$, $CH_2CH_3$, $CH=CH_2$ or $C\equiv CH$, R is fluorophenyl, aryl of up to 8 carbon atoms or an alkyl group of 1–6 carbon atoms and $a$ is a single or a double bond; provided that when $a$ is a single bond, $R^1$ cannot be $CH_3$ and

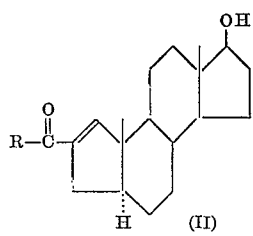

wherein R is likewise fluorophenyl, aryl of up to 8 carbon atoms or an alkyl group of 1–6 carbon atoms.

The compounds of this invention are useful as antifertility, anabolic and antigonadotrophic agents.

CROSS-REFERENCE TO RELATED APPLICATION

This application is a continuation-in-part of my copending application Ser. No. 499,016, filed Oct. 20, 1965.

BACKGROUND OF THE INVENTION

Field of the invention

This invention relates to certain novel A-nor-steroids and to processes for preparing them. More specifically, the invention relates to selected A-nor-5α-androstane derivatives which have an acyl group in the 2 position.

Description of the prior art

Of interest in connection with the present invention is the publication of A. Castres de Paulet and J. Bascoul in Bull. Soc. Chim., 1960, 599.

This reference describes the reaction

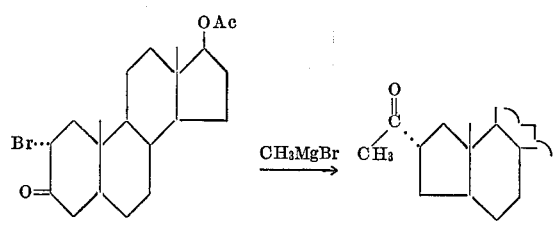

but the product is neither described nor identified, leaving some doubt as to whether the 17β-acetoxy or the 17β-hydroxy compound is obtained.

SUMMARY AND DETAILS OF THE INVENTION

The novel products of this invention are represented by the formulas:

(I)

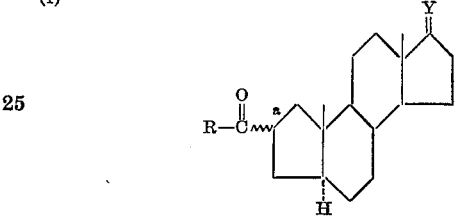

where Y is =O or the group

$$\underset{-R^1}{\overset{OH}{|}}$$

$R^1$ being $CH_3$, $C_2H_5$, $CH=CH_2$ or $C\equiv CH$; and (II)

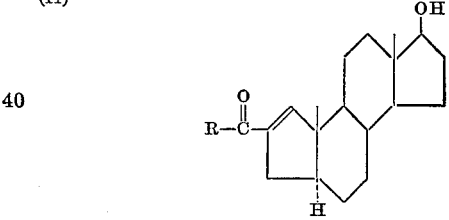

R in each instance is defined as fluorophenyl, aryl of up to 8 carbons or a 1–6 carbon alkyl group and $a$ is a single bond or a double bond between carbons 1 and 2; provided that when $a$ is a single bond, $R^1$ cannot be $CH_3$.

The products of Formula I where $a$ is a single bond and

$$Y\ is\ \underset{-R^1}{\overset{OH}{|}}$$

are prepared by hydrolyzing a 2α-(cyanoamidino)-A-nor-5α-androstane of the formula (III)

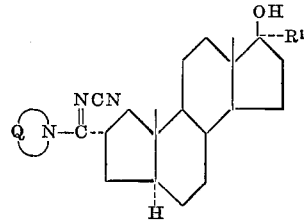

where Q is alkylene of 4–5 chain carbon atoms and a total of 4–6 carbon atoms or is a 3-oxa-1,5-pentylene and $R^1$ is $C_2H_5$, $CH=CH_2$ or $C\equiv CH$, under mild alkaline conditions, preferably at a temperature between about 50–100° C. to obtain a 2α-aminocarbonyl-A-nor-androstane of the formula (IV)

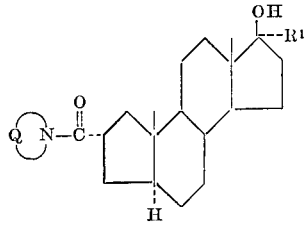

Compound IV is then reacted with fluorophenyl-, aryl-, or a lower alkylmagnesium halide by conventional methods to obtain the aforementioned products of the Formula I as follows

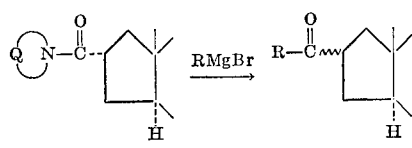

The products of Formula I where Y is

and $a$ is either a single or a double bond can be prepared by reacting a 2-formyl-A-nor-5α-androstane or 1-androstene of the formula (V)

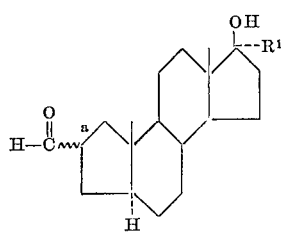

wherein $a$ and $R^1$ are as previously defined, with an aromatic or an alkylmagnesium halide, followed by oxidation of the resulting 2-(1′-hydroxyalkyl)-A-nor-5α-androstane with chromic acid or in the case where $a$ is a double bond, with 2,3-dichloro-5,5-dicyano-p-benzoquinone.

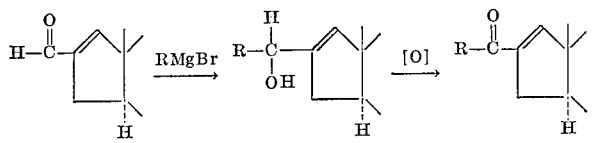

To obtain the products of Formula I where Y is =O, the reactions of the preceding paragraph are carried out beginning with the compounds of Formula V except that $R^1$ is replaced with hydrogen. Then when the final products of the preceding paragraph are obtained the 17-hydroxy group is converted to the 17-keto group through conventional oxidation methods.

The products of Formula II are obtained by employing a reactant of formula (VI)

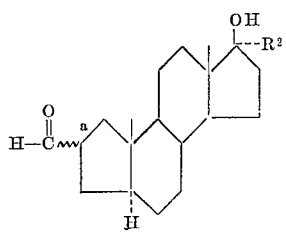

where $R^2$ is H and treating it with fluorophenylmagnesium halide, arylmagnesium halide or a lower alkyl-magnesium halide, followed by oxidation of the resulting 2-(1′-hydroxyalkyl)-A-nor-5α-androstane with 2,3 - dichloro-5,6-dicyano-p-benzoquinone.

The products of Formula I, where $a$ is a double bond, and those of Formula II can also be obtained by treatment with N-bromosuccinimide of the corresponding 2-acyl-A-nor-5α-androstan-17β-ol (itself obtained from a 2α-aminocarbonyl-A-nor-5α-androstan-17β-ol and the appropriate organic magnesium halide), whereby a 2ξ-bromo-2ξ-acyl-A-nor-5α-androstan-17β-ol is formed, followed by dehydrogenation with lithium chloride in dimethylformamide, as shown in the equation:

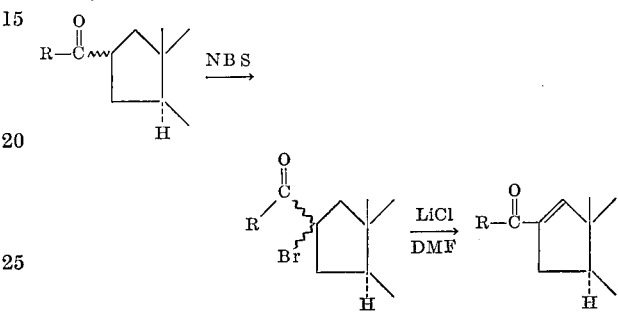

The starting material of Formula III used to prepare compounds of Formula I is prepared by reacting, in the temperature range of 0 to 50° C., cyanogen azide with a steroid Δ²-enamine of the appropriate structure, i.e., a 3-amino-2-androstene having the 17 (OH, $R^1$) substituents. This process is represented by the equation:

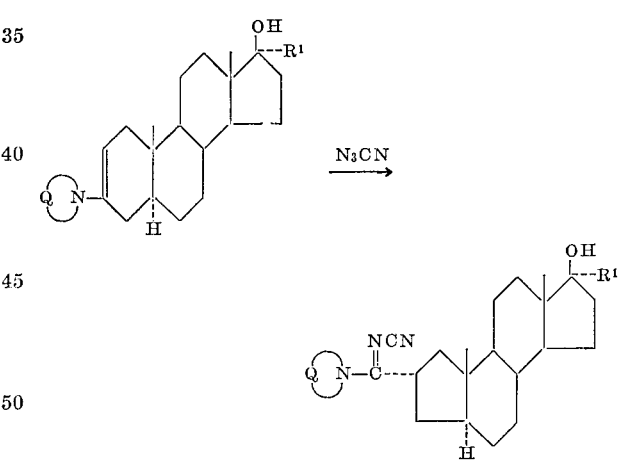

where Q and $R^1$ are as above.

The 3-amino-2-androstenes which are the starting materials in this process are themselves prepared, in accordance with known methods, by reacting the appropriate 3-ketoandrostane with a secondary cyclic amine of the formula

where Q is as defined above, such as pyrrolidine, piperidine, 4-methyl-piperidine or morpholine.

The process is best carried out by dissolving the 3-amino-2-androstene in a dry organic solvent which, at the chosen reaction temperature, is unreactive with the steroid and with cyanogen azide (e.g., lower alkyl alkanoates such as methyl acetate, ethyl acetate, ethyl propionate, ethyl butyrate; lower alkanenitriles such as acetonitrile, propionitrile; aromatic hydrocarbons such as benzene, toluene; etc.) and adding slowly to this solution a solution of cyanogen azide in a suitable solvent such as ethyl acetate or acetonitrile while maintaining the temperature in the range of 0–50° C., preferably 15–30°

C. The reaction mixture is stirred at room temperature until nitrogen evolution ceases. The product is then isolated by filtration or, if it is soluble in the solvent, by evaporation of the solvent. It is either used directly in subsequent reactions, or, preferably, purified by fractional crystallization or chromatography.

Care must be taken to maintain the cyanogen azide in solution form, for if it is dry or nearly dry, it is an explosive material.

The starting materials of Formulas V and VI where $a$ is a single bond and where $R^1$ is $C_2H_5$ or $CH=CH_2$ and $R^2$ is H, $C_2H_5$ or $CH=CH_2$, are prepared by reacting the appropriate 2α-(cyanoamidino)-A-nor-5α-androstane of the formula

VII)

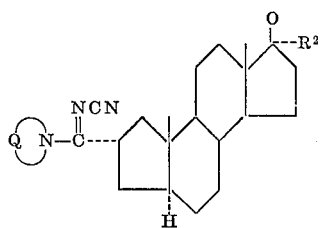

where all symbols have the previously stated significance with an alkali metal at a temperature between about −80° and +20° C. in an anhydrous, liquid reaction medium which is a 1–2 carbon monoalkylamine or ammonia, and hydrolyzing the reaction product under neutral to basic conditions. This process is represented by the equation

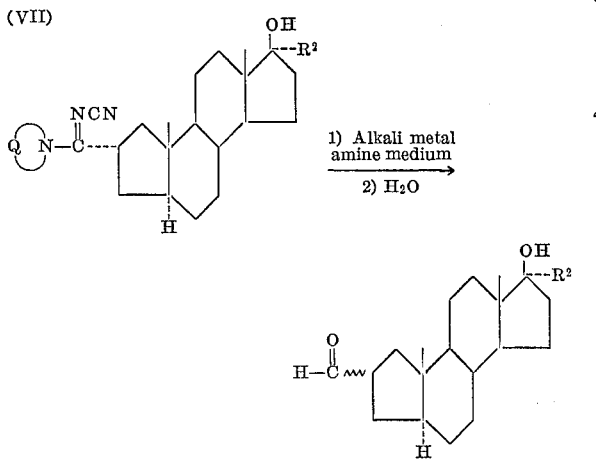

where Q and $R^2$ are as above. Optionally, the resulting 2-formyl-A-nor-5α-androstane is dehydrogenated to the corresponding 2-formyl-A-nor-5α-androst-1-ene by treatment with 2,3-dichloro-5,6-dicyano-p-benzoquinone in the presence of an acidic catalyst.

The process leading to the starting materials of Formulas V and VI is best carried out by dissolving or dispersing the 2α-(cyanoamidino)-A-nor-5α-androstane in anhydrous liquid ammonia, methylamine or ethylamine. To this solution or suspension, preferably but not necessarily also containing 2–3 molar equivalents of a buffer such as ammonium acetate and maintained within the temperature range of about −80° to +20° C., is added a slight excess of an alkali metal (sodium or potassium can be used, but lithium is preferred). After cessation of the initial reaction, as evidenced by an abrupt color change from colorless or yellow to blue, the mixture is stirred for a few minutes and then treated with excess ammonium chloride until the blue color is discharged. Addition of water or aqueous base and extraction with an organic solvent, followed by hydrolysis, conveniently accomplished by chromatography or hydrated alumina, gives the desired 2-formyl-A-nor-5α-androstane.

The reactants of Formulas V and VI where $R^1$ or $R^2$ is ethynyl are obtained from the corresponding 2-formyl-17-hydroxy steroids by first acetalizing the formyl group, for example, with ethylene glycol, oxidizing the 17-hydroxy group to a 17-keto group and treating the resulting 17-keto steroid acetal with an ethynylating agent such as sodium acetylide or ethynylmagnesium bromide to form the corresponding 17α-ethynyl-17β-hydroxy steroid, then hydrolyzing back the 2-acetal group to the 2-formyl group.

Detailed descriptions of the preparation of representative members of both classes of starting materials follow in Examples A through L. In these examples, as well as in the numbered examples illustrating the products of this invention, the Greek letter ξ used in some of the names and the bond symbol ∼ used in some of the formulas signify that the product is a mixture of alpha and beta epimers or that the compound is of uncertain configuration.

EXAMPLE A

2α - (pyrrolidinocyanoiminomethyl) -A-nor-5α-androstan-17β-ol)

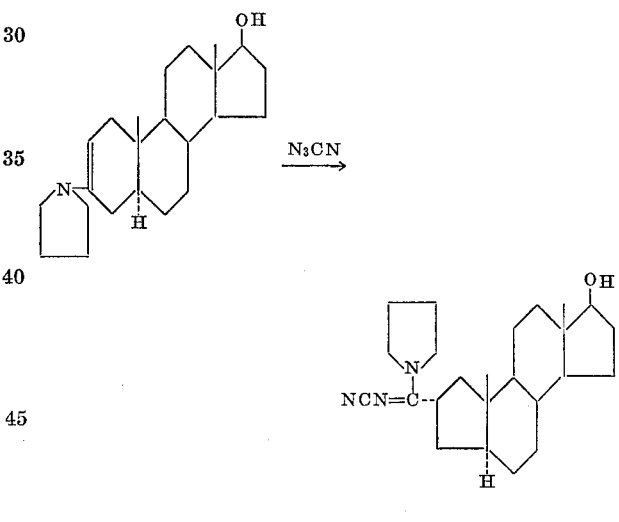

3-pyrrolidino-2-androsten -17β-ol was prepared by refluxing a solution of 10 g. (34.5 mmoles) of androstanolone, 10 ml. of pyrrolidine, and 100 ml. of benzene and collecting the distillate in a water trap. After 1.5 hours, about 0.76 ml. of water was collected. Evaporation of the benzene solution to dryness under reduced pressure, and trituration of the residue with petroleum ether, gave about 11 g. of an almost colorless solid that was dried under reduced pressure over calcium chloride at 78° C.

*Analysis.*—Calcd. for $C_{23}H_{38}NO$ (percent): C, 80.41; H, 10.86; N, 4.08. Found (percent): C, 80.41; H, 10.92; N, 3.93.

A suspension of 1.82 g. (5 mmoles) of the above Δ²-enamine in 30 ml. of ethyl acetate was stirred vigorously while 2.0 ml. of 2.80 M (5.6 mmoles) of cyanogen azide in ethyl acetate was added dropwise over a period of about 5 minutes. During the addition of cyanogen azide, nitrogen was evolved rapidly and in close to quantitative yield as judged by use of a wet-test meter. After completion of the addition of cyanogen azide, the reaction mixture was stirred for 1.25 hours at room temperature and then filtered to remove the insoluble precipitate. After being rinsed with ether and air-dried the solid weighed 1.5 g., and melted at 245–250° C. with decomposition. Purification of a portion of the 2α-(pyrrolidinocyanoiminomethyl)-A-nor-5α-androstan-17β-ol was accomplished by dissolving 0.4 g. in 75 ml. of boiling benzene and filtering the hot solution. To the filtrate 15 ml. of hexane was added. After about 1 hour a white crystalline product weighing 0.3 g. was collected by filtration. An analytical sample was prepared by a second crystallization from benzene-hexane and melted at 261.5–263.5° C. with decomposition.

$\nu_{max.}^{Nujol}$ 3690(OH); 2180(NC≡N); 1560(N=C)cm$^{-1}$.

$\lambda_{max.}^{EtOH}$ 250mμ(ε=16,600).

*Analysis.*—Calcd. for $C_{24}H_{37}N_3O$ (percent): C, 75.15; H, 9.72; N, 10.92. Found (percent): C, 74.82; H, 9.41; N, 10.94.

Instead of pyrrolidine, other equivalent cyclic secondaryamines, such as 4-methylpyrrolidine, piperidine or morpholine can be used to prepare the corresponding Δ²-enamines by reaction with androstanolone, and these products can be treated with cyanogen azide to give the corresponding 2α - (cyanoamidino)-A-nor-5α-androstan-17β-ols.

EXAMPLE B

17α - methyl - 2α - (pyrrolidinocyanoiminomethyl) - A - nor-5α-androstan-17β-ol

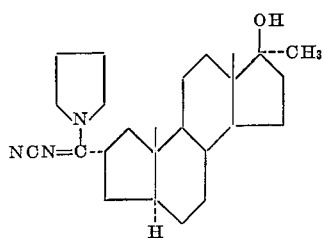

A solution of 20.0 g. (66 mmoles) of 17α-methyl17β-hydroxy-5α-androstan-3-one and 20 ml. of distilled pyrrolidine in 100 ml. of benzene was heated under a reflux condenser fitted with a water trap for 3.5 hours. Evaporation of the dry benzene solutions to dryness gave a white solid which was dried further, to remove traces of pyrrolidine, by heating it at 70–75° C. at about 0.1 mm. pressure for 1 hour. The resulting, dry Δ²-enamine was added to 400 ml. of ethyl acetate which had been purified by passage through neutral (activity grade I) alumina and the mixture was maintained at 20–25° C. with vigorous stirring while 30 ml. of 2.24 molar (67 mmoles) of cyanogen azide in ethyl acetate was added dropwise over a period of 0.5 hour. After 12 hours at room temperature the reaction had evolved a total of 1540 ml. (94% of theory) of nitrogen. The crude, sparingly soluble cyanoamidine, which was collected by filtration and washed with two 50-ml. portions of fresh ethyl acetate, weighed 17.2 g., M.P. 250–252° C. dec. Purification was accomplished by extracting the crude material with boiling toluene (150 ml./g.), filtering, and diluting the cooled filtrate with equal volume of petroleum ether (B.P. 30–60° C.). This gave a total of 12.9 g. of 17α-methyl-2-(pyrrolidinocyanoiminomethyl)-A-nor-5α-androstan-17β-ol as an almost colorless powder, M.P. 262–264° C. dec.

$\nu_{max.}^{CHCl_3}$ 3750, 3650 (OH), 2200 (C≡N), 1568 (C=N) cm$^{-1}$.

$\lambda_{max.}^{EtOH}$ 251 mμ (ε=16,400).

*Analysis.*—Calcd. for $C_{25}H_{39}N_3O$ (percent): N, 10.57. Found (percent):N, 10.46.

In similar manner, 17α-ethyl-17β-hydroxy-5α-androstan-3-one is converted to an enamine and then to 17α-ethyl-2α-(pyrrolidinocyanoiminomethyl) - A - nor - 5α-androstan-17β-ol and 17α-vinyl-5α-androstan-17β-ol-3-one is converted to an enamine and then to 17α-vinyl-2α-(pyrrolidinocyanoiminomethyl)-A-nor-5α-androstan-17β-ol.

EXAMPLE C

17α-ethylnyl-2α-(pyrrolidinocyanoiminomethyl)-A-nor-5α-androstan-17β-ol

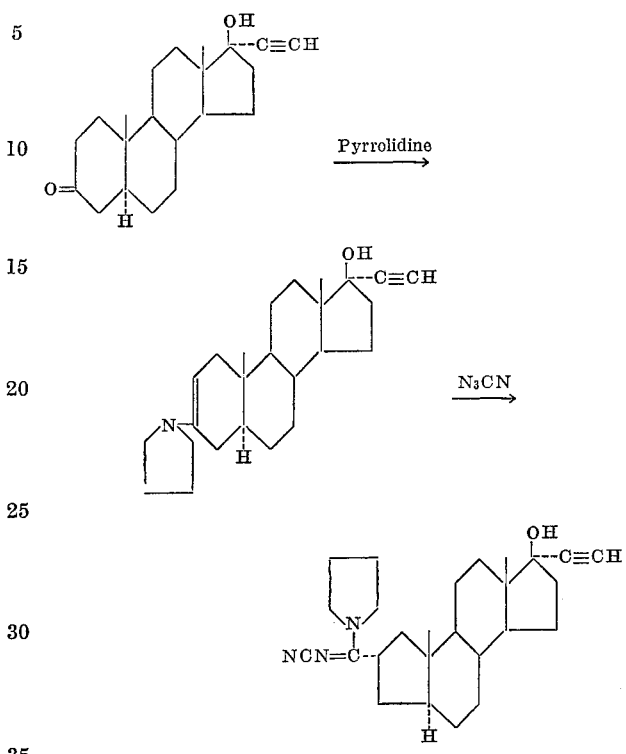

The starting material, 17α-ethynyl-17β-hydroxy-5α-androstan-3-one, was prepared as follows:

Fourteen grams (50 mmoles) of 5α-androstane-3,17-dione was converted to 3-pyrrolidino-2-androsten-17-dione was converted to 3-pyrrolidino-2-androsten-17-one with 10 ml. of pyrrolidine by a precdure exactly analogous to that described in Example B above.

A solution of ethynyl magnesium bromide in tetrahydrofuran was prepared by adding 50 ml. of 3 M methyl magnesium bromide to 200 ml. of dry tetrahydrofuran, removing 80 ml. of solvent by distillation, adding 300 ml. more of dry tetrahydrofuran, and passing purified acetylene into the ice-cooled solution for 1.5 hours.

To the Grignard reagent was added the crude, carefully dried 3-pyrrolidino-2-androsten-17-one and the mixture was heated at reflux temperature for 5.5 hours. The reaction mixture was distilled until 250 ml. of solvent had been removed and, after cooling, it was poured with stirring into 1 liter of water containing 150 g. of ammonium chloride. After 15 minutes, the white solid was collected by filtration and air-dried for 48 hours. Crystallization of 1 g. of the 15 g. of crude product from dioxane-water, followed by washing with a small amount of acetone, gave 0.5 g. of 17α-ethynyl-17β-hydroxy-5α-androstan-3-one, M.P. 293–295° C.

$\nu_{max.}^{Nujol}$ 3330 (≡CH), 1700 (C=O) cm$^{-1}$.

The crude 17α-ethynyl-17β-hydroxy-5α-androstan-3-one was converted to the Δ²-enamine with 15 ml. of pyrrolidine and 400 ml. of benzene by the procedure described in Example B. The dry enamine was treated with 22.0 ml. of 2.24 M cyanogen azide in 500 ml. of ethyl acetate at 20–25° C., giving a cyanoamidine which was soluble in the reaction medium. Filtration of the reaction mixture to remove a trace of brown gum followed by evaporation in vacuo to about 100 ml. and dilution with about 400 ml. of petroleum ether gave 18 g. of cream-colored solid, M.P. 195–205° C., 17 g. of which was applied as a chloroform solution to a column of 500 g. of neutral (activity III) alumina. Elution with benzene-petroleum ether (3:1), then benzene-chloroform (4:1) gave in the latter eluate a colorless glass which, on trituration with benzene, gave 8.4 g. of 17α-ethynyl-2α-(pyrrolidinocyanoiminomethyl)-A-nor-5α-androstan-17β-ol, M.P. 252–257° C. An analytical sample was prepared by crystallization from benzene, M.P. 254–255° C.; $\alpha_D^{24}$ —8° (c. 1.8, chloroform).

$\nu_{max.}^{CHCl_3}$ 3620 (OH), 3330 (≡CH), 2180 (C≡N), 1560 (C=N) cm$^{-1}$.

Analysis.—Calcd. for $C_{26}H_{37}N_3O$ (percent): C, 76.61; H, 9.15; N, 10.31. Found (percent): C, 76.64; H, 9.17; N, 10.20.

EXAMPLE D

2ξ-formyl-A-nor-5α-androstan-17β-ol

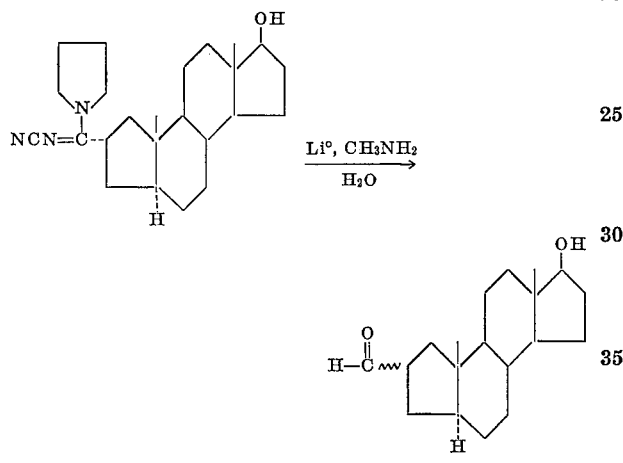

To a stirred solution of 20.8 g. (54 mmoles) of 2α-(pyrrolidinocyanoiminomethyl) - A - nor-5α-androstan-17β-ol in about 700 ml. of methylamine cooled in a Dry Ice-acetone bath was added 9 g. (115 mmoles) of ammonium acetate. After about 15 minutes, 2.0 g. (excess) of lithium ribbon, which had been cut into small pieces and washed with cyclohexane, was added all at once. Exactly 5 minutes after a persistent dark blue color first pervaded the reaction mixture, the mixture was treated with sufficient ammonium chloride (about 30 g.) to discharge the blue color. The methylamine was allowed to evaporate overnight and the residue was taken up in water and ether. The water layer was extracted with ether and the ether layers were combined, washed with saturated sodium chloride solution, and dried over sodium sulfate. Evaporation in vacuo gave 17.2 g. of steroid as a white solid. Application of this product as a solution in 70 ml. of benzene to a column of 500 g. of basic alumina (activity III) and elution with benzene gave 13.6 g. (86% yield) of 2ξ-formyl-A-nor-5α-androstan-17β-ol as a nearly colorless glass.

This product (from another preparation) melted at 109–120° C. after crystallization from hexane, $\alpha_D^{24}$—5° (c. 1.0, chloroform).

$\nu_{max.}^{CHCl_3}$ 3600, 3440(OH); 2720, 1715(CHO) cm$^{-1}$.

Analysis.—Calcd. for $C_{19}H_{30}O_2$ (percent): C, 78.57; H, 10.41. Found (percent): C, 78.87; H, 10.48.

The proton n.m.r. spectrum shows that this aldehyde is a mixture of C–2 epimers.

EXAMPLE E

17α-methyl-2ξ-formyl-A-nor-5α-androstan-17β-ol

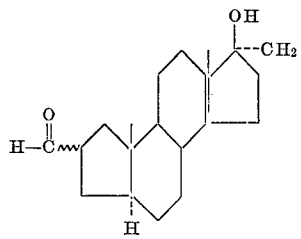

This compound was prepared from 12.0 g. of 17α-methyl-2α-(pyrrolidinocyanoiminomethyl) - A - nor-5α-androstan - 17β - ol by a procedure analogous to that described in Example D. The 17α-methyl-2-formyl-A-nor-5α-androstan-17β-ol was obtained pure in 23% yield; M.P. 120.5–127.5° C.; $\alpha_D$—21° (c. 1.2, CHCl$_3$).

$\nu_{max.}^{CHCl_3}$ 3700, 3560 (OH); 2780 (CHO); 1730 (CO) cm$^{-1}$.

Analysis.—Calcd. for $C_{20}H_{32}O_2$ (percent): C, 78.89; H, 10.59. Found (percent): C, 79.13; H, 10.56.

The proton nuclear magnetic resonance spectrum (CCl$_4$, tetramethylsilane internal) indicated that the aldehyde was a mixture of about two parts of the alpha-formyl- and one part of the beta formyl-A-nor-steroids.

EXAMPLE F 2-formyl-A-nor-5α-androst-1-en-17β-ol

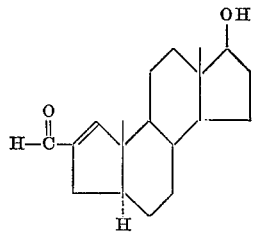

A solution of 1.16 g. (4 mmoles) of 2ξ-formyl-A-nor-5α-androstan-17β-ol, 1.30 g. (5.8 mmoles) of 2,3-dichloro-5,6-dicyano-p-benzoquinone, and 60 mg. (0.3 mmole) of p-toluene-sulfonic acid monohydrate in 150 ml. of benzene was heated at reflux temperature for 1.3 hours. The mixture was cooled, 150 ml. of ether was added, and the mixture was extracted with 100-ml. portions of cold 5% aqueous sodium hydroxide. The organic layer was washed with water and with saturated aqueous sodium chloride, and then dried over sodium sulfate and evaporated in vacuo, giving 1.15 g. of yellow solid which was chromatographed on 50 g. of neutral (activity III) alumina. Elution with benzene gave 1.0 g. of 2-formyl-A-nor-5α-androst-1-en-17β-ol which, after crystallization from acetone-hexane, weighed 0.692 g. (60% yield); M.P. 137.5–138.5° C.; $\alpha_D^{23}$+77° (c. 0.8, CHCl$_3$).

$\nu_{max.}^{CHCl_3}$ 3570, 3480 (OH), 1670 (C=O), 1588 (C=C) cm$^{-1}$.

$\lambda_{max.}^{EtOH}$ 240mμ(ϵ=14,100).

Analysis.—Calcd. for $C_{19}H_{28}O_2$ (percent): C, 79.12; H, 9.79. Found (percent): C, 79.41; H, 9.80.

EXAMPLE G

17α-methyl-2-formyl-A-nor-5α-androst-1-en-17β-ol

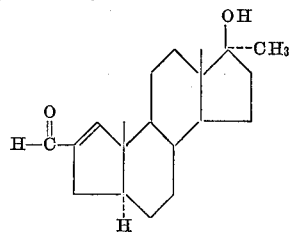

A solution of 600 mg. (1.97 mmole) of 17α-methyl-2ξ-formyl-A-nor-5α-androstan-17β-ol, 600 mg. of 2,3-dichloro-5,6-dicyano-p-benzoquinone (2.6 mmoles), and 10 mg. of p-toluenesulfonic acid monohydrate in 20 ml. of dioxane was heated at reflux temperature for 2.5 hours. Benzene was added to the reaction mixture and white, crystailline quinol, weighing 470 mg., was removed by filtration. The filtrate was evaporated to dryness and then applied as a solution in benzene to 50 g. of neutral (activity III) alumina. Elution with benzene-petroleum ether (3:1) gave 120 mg. (20% yield) of 17α-methyl-2-formyl-A-nor 5α-androst-1-en-17β-ol, M.P. 146.0–149.0° C. (acetone-hexane); $\alpha_D{}^{23}+50°$ (c. 0.8, CHCl$_3$).

$\nu_{max.}^{CHCl_3}$ 3570, 3480 (OH), 1667 (C=O), 1580 (C=C) cm.$^{-1}$.

$\lambda_{max.}^{EtOH}$ 239mμ(ε=12,600).

*Analysis.*—Calcd. for C$_{20}$H$_{30}$O$_2$ (percent): C, 79.42; H, 10.00. Found (percent): C, 79.18; H, 9.87.

Likewise, 17α-ethyl-2ξ-formyl-A-nor-5α-androstan-17β-ol is dehydrogenated to 17α-ethyl-2-formyl-A-nor-5α-androst-1-en-17β-ol, and 17α-vinyl-2ξ-formyl-A-nor-5α-androstan-17β-ol is dehydrogenated to 17α-vinyl-2-formyl-A-nor-5α-androst-1-en-17β-ol.

EXAMPLE H 2-formyl-A-nor-5α-androst-1-en-17-one

A solution of 0.50 g. of 2-formyl-A-nor-5α-androst-1-en-17β-ol in 3 ml. of dry pyridine was added to a mixture prepared by adding 0.5 g. of chromium trioxide to 8 ml. of dry pyridine at 15–25° C. The resulting dark solution was stirred at room temperature for 24 hours and then poured into 100 ml. of water containing 20 g. of sodium dihydrogen phosphate. Extraction with hexane and then either gave, on evaporation of the washed and dried organic extracts, 0.37 g. of 2-formyl-A-nor-5α-androst-1-en-17-one; M.P. 149–154° C.

$\nu_{max.}^{CHCl_3}$ 1745 (C-17 C=O), 1676 (CHO), (1600 C=C) cm.$^{-1}$

*Analysis.*—Calcd. for C$_{19}$H$_{26}$O$_2$ (percent): C, 79.68; H, 9.15. Found (percent): C, 79.59; H, 9.11.

A similar procedure applied to 2ξ-formyl-A-nor-5α-androstan-17β-ol affords 2ξ-formyl-A-nor-5α-androstan-17-one.

The following four examples (Examples I–L) describe the reaction sequence leading to another starting material for the products of this invention, 17α-ethynyl-2-formyl-A-nor-5α-androst-1-en-17β-ol.

EXAMPLE I

Ethylene acetal of 2-formyl-A-nor-5α-androst-1-en-17β-ol

A mixture of 8.0 g. (28 moles) of 2-formyl-A-nor-5α-androst-1-en-17β-ol (see Example F), 0.2 g. of p-toluenesulfonic acid, 10 ml. of ethylene glycol, and 100 ml. of benzene was heated under a reflux condenser fitted with a water trap for 18 hours. The mixture was then cooled and washed twice with 5% aqueous sodium bicarbonate. The benzene solution was washed with saturated aqueous sodium chloride, dried over sodium sulfate, and evaporated in vacuo, affording 8.5 g. of the ethylent acetal of 2-formyl-A-nor-5α-androst-1-en-17β-ol as a light yellow glass.

$\nu_{max.}^{CHCl_3}$ 3700, 3560 (OH) cm.$^{-1}$ (no band in carbonyl region).

The propylene acetal is obtained in the same manner, using 1,2-propylene glycol.

EXAMPLE J

Ethylene acetal of 2-formyl-A-nor-5α-androst-1-en-17-one

Eigth grams of the acetal of Example I dissolved in 25 ml. of pyridine, was added to the product obtained by adding 7.0 g. of chromium trioxide to 135 ml. of pyridine at 15–25° C., and the whole was stirred at room temperature for 48 hours. The mixture was filtered through sintered glass and the filter cake washed with three 100-ml. portions of 20% aqueous sodium dihydrogen phosphate, which was then added to the pyridine filtrate together with 700 ml. more of the 20% aqueous sodium dihydrogen phosphate. Extraction of the filter cake with ether and extraction of the pyridine-water mixture with ether gave, on combination of the dried ether extracts and evaporation in vacuo, 6.4 g. of the ethylene acetal of 2-formyl-A-nor-5α-androst-1-en-17-one.

$\nu_{max.}^{CHCl_3}$ 1740 cm.$^{-1}$ (C-17 C=O)

EXAMPLE K

Ethylene acetal of 17α-ethynyl-2-formyl-A-nor-5α-androst-1-en-17β-ol

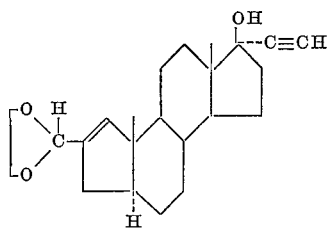

A solution of 6.4 g. of the ethylene acetal of 2-formyl-A-nor-5α-androst-1-en-17-one in 200 ml. of dry dimethylsulfoxide was treated with about 5 g. of sodium acetylide and the mixture was allowed to stand at room temperature for 3 days. The dark reaction mixture was poured into 1 liter of ice water and the aqueous mixture was extracted with ether, giving 6.67 g. of the ethylene acetyl of 17α-ethynyl-2-formyl-A-nor-5α-androst-1-en-17β-ol.

$\nu_{max.}^{CHCl_3}$ 3330 cm.$^{-1}$ (C≡CH)

EXAMPLE L

17α-ethynyl-2-formyl-A-nor-5α-androst-1-en-17β-ol

A solution of 6.6 g. of the acetal of Example K, with 1.0 g. of p-toluenesulfonic acid and 10 ml. of water in 30 ml. of ethanol, was allowed to stand at room temperature for 7 hours, and then poured into water. The aqueous mixture was extracted with ether and the ether washed wih 5% aqueous sodium bicarbonate and dried. Evaporation of the solvent in vacuo gave a glass which was chromatographed on 200 g. of neutral (activity III) alumina to give about 4.6 g. of 17α-ethynyl-2-formyl-A-nor-5α-androst-1-en-17β-ol.

$\nu_{max.}^{CHCl_3}$ 3330, 1675, 1585 cm.$^{-1}$

Using the initial starting materials whose preparation has been described in detail above, the products of the present invention, i.e., the products having one of the structures (I) or (II), are prepared by one of the methods briefly described above and illustrated in greater detail in the examples that follow.

EXAMPLE 1

17α-ethynyl-2ξ-acetyl-A-nor-5α-androstan-17β-ol

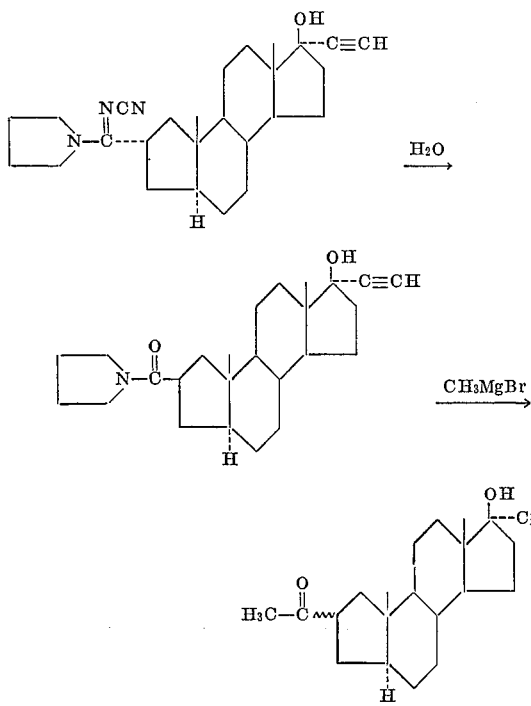

*Part A.*—A solution of 8.11 g. (19 mmoles) of 17α-ethynyl-2α-(pyrrolidinocyanoiminomethyl) - A - nor-5α-androstan-17β-ol (see Example C) in 150 ml. of ethanol and 20 ml. of 1.0 N sodium hydroxide was heated at reflux for 3 hours and then gradually diluted with water to a volume of 500 ml. and acidified with dilute hydrochloric acid. The aqueous mixture was extracted with ether and the ether washed twice with 5% sodium hydroxide and then with saturated aqueous sodium chloride solution. Evaporation of the dried ether extract gave 4.6 g. of a colorless glass which was chromatographed on neutral (activity III) alumina. Crystallization from ethyl acetate-petroleum ether gave 4.0 g. of 17α-ethynyl-2α-(pyrrolidinocarbonyl)-A-nor-5α-androstan-17β-ol, M.P. 150–153° C.

$\nu_{max.}^{CHCl_3}$ 3300, 3640 (OH); 3730 ($\equiv$CH); 1625 (amide C=O) cm$^{-1}$

*Analysis.*—Calcd. for $C_{25}H_{37}NO_2$ (percent): C, 78.28; H, 9.72; N, 3.65. Found: (percent): C, 78.16; H, 9.99; N, 3.69.

*Part B.*—To 3.75 g. (10 mmoles) of 17α-ethynyl-2α-(pyrrolidinocarbonyl)-A-nor-5α-androstan-17β-ol in 250 ml. of tetrahydrofuran was added 20 ml. of 3 M methyl magnesium bromide in ether and the reaction mixture was heated at reflux temperature for 7 hours. The mixture was distilled to remove 125 ml. of solvent, cooled, and poured into 500 ml. of water containing 50 g. of ammonium chloride. Extraction with ether gave 3.25 g. of a glass which was applied in benzene to a column of 100 g. of neutral (activity III) alumina. Elution with petroleum ether-benzene (3:1) then with petroleum ether-benzene (1:1) and finally with benzene gave in each eluate, after crystallization from hexane and then cyclohexane, mixtures of C–2 epimeric 17α-ethynyl-2ξ-acetyl-A-nor-5α-androstan-17β-ol (in the order of elution):

A—420 mg., M.P. 123–142° C., $\alpha_D^{24}$—30° (c. 1.5, CHCL$_3$)

B—730 mg., M.P. 142–149° C., $\alpha_D^{24}$—33° (c. 1.4, CHCL$_3$)

C—560 mg., M.P. 130–149° C. $\alpha_D^{24}$—39° (c. 1.4, CHCL$_3$)

$\nu_{max.}^{CHCl_3}$ for A, B, and C: 3620 (OH), 3330 ($\equiv$CH), 1710 (C=O) cm$^{-1}$

*Analysis.*—Calcd. for $C_{22}H_{32}O_2$ (percent): C, 80.44; H, 9.83. Found (percent) for A: C, 80.35; H, 10.02—B: C, 80.44; H, 10.05—C: C, 80.44; H, 9.88.

Applying the procedure of Example 1 to the 2-aminocarbonyl steroids of column A with the requisite alkylmagnesium halide (e.g., methyl-, ethyl-, propyl-, butyl- or amylmagnesium bromide) gives the 2-acyl-A-nor-5α-androstan-17β-ols of column B.

| Column A | Column B |
|---|---|
| 17α-ethyl-2α-(pyrrolidinocarbonyl)-A-nor-5α-androstan-17β-ol. | 17α-ethyl-2ξ-acetyl-A-nor-5α-androstan-17β-ol. |
| 17α-vinyl-2α-(piperidinocarbonyl)-A-nor-5α-androstan-17β-ol. | 17α-vinyl-2ξ-acetyl-A-nor-5α-androstan-17β-ol. |
| 2α-(morpholinocarbonyl)-A-nor-5α-androstan-17β-ol. | 2ξ-propionyl-A-nor-5α-androstan-17β-ol. |
| 17α-ethyl-2α-(4-methylpiperidinocarbonyl)-A-nor-5α-androstan-17β-ol. | 17α-ethyl-2ξ-butyryl-A-nor-5α-androstan-17β-ol. |
| 17α-vinyl-2α-(pyrrolidinocarbonyl)-A-nor-5α-androstan-17β-ol. | 17α-vinyl-2ξ-heptanoyl-A-nor-5α-androstan-17β-ol. |
| 17α-ethynyl-2α-(pyrrolidinocarbonyl)-A-nor-5α-androstan-17β-ol. | 17α-ethynyl-2ξ-propionyl-A-nor-5α-androstan-17β-ol. |

EXAMPLE 2

2-acetyl-A-nor-5α-androst-1-en-17β-ol

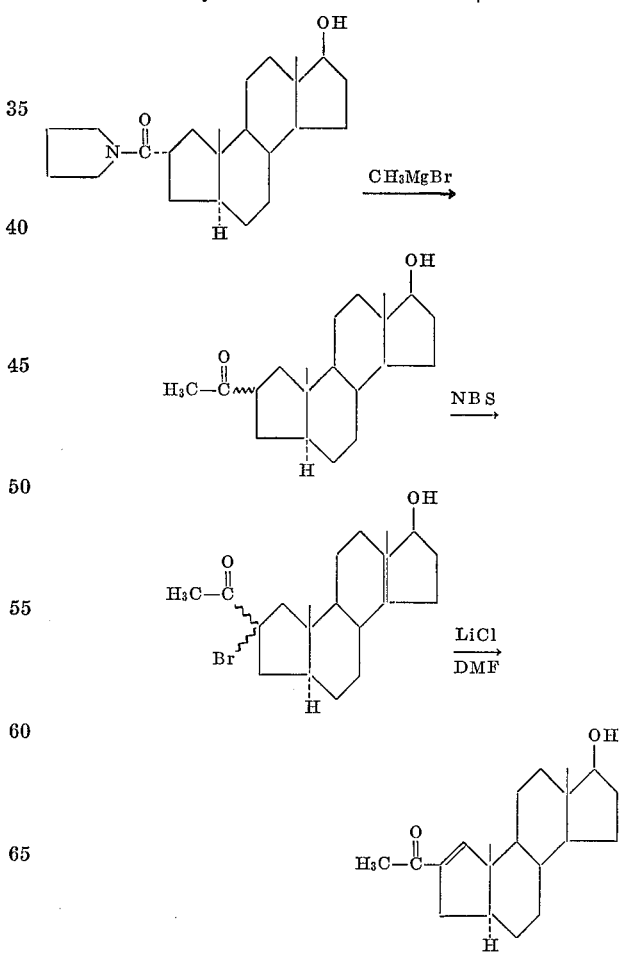

*Part A.*—To a solution of 7.78 g. (21.7 mmoles) of 2α - (pyrrolidinocarbonyl)-A-nor-5α-androstan-17β-ol in 300 ml. of dry tetrahydrofuran was added 55 ml. of 3 M methylmagnesium bromide in ether. The reaction mixture was concentrated by distillation through a fractionating column until 100 ml. of distillate had been collected and then it was heated at reflux temperature for 5.5 hours. An additional 160 ml. of distillate was removed and the residual mixture was poured into aqueous ammonium chloride. Extraction with ether gave 6.62 g. of crude ketone as a yellow glass which was applied to a column of 150 g. of neutral (activity III) alumina and eluted with benzene-ether (9:1). Crystallization of the eluate from acetone-petroleum ether gave 5.56 g. (84% yield) of crystalline 2ξ-acetyl - A - nor-5α-androstan-17β-ol, M.P. 124.5–126.5° C. An analytical sample melted at 127.5–128.5° C.; $\alpha_D^{24}+10°$ (c. 2.04, CHCl$_3$);

$\nu_{max.}^{CHCl_3}$ 3600, 3460 (OH), 1705 (C=O) cm$^{-1}$;

n.m.r. in CDCl$_3$: 9.25τ, unresolved at 500 c.p.s. sweep-width, area 6 (angular CH$_3$), 7.18τ singlet, area 3 (CH$_3$CO), 8.20τ singlet, area 1 (OH by disappearance with CF$_3$CO$_2$H).

*Analysis.*—Calcd. for C$_{20}$H$_{32}$O$_2$ (percent): C, 78.89; H, 10.59. Found (percent): C, 79.01; H, 10.58.

*Part B.*—A mixture of 304 mg. (1 mmole) of 2ξ-acetyl-A-nor-5α-androstan-17β-ol, 215 mg. (1.2 mmoles) of N-bromo-succinimide, and 20 ml. of carbon tetrachloride was heated at reflux and irradiated with a 175-watt sun-lamp for 5 minutes. The cool reaction mixture was diluted with an equal volume of ether and the solid removed by filtration. The clear filtrate was washed with 3% aqueous potassium iodide, water, and finally with saturated aqueous sodium chloride. Evaporation of the dried solution gave 0.415 g. of brown crystals which were chromatographed on 15 g. of neutral (activity III) alumina, affording 0.112 g. of 2ξ-bromo-2ξ-acetyl-A-nor-5α-androstan-17β-ol in the 1:1 benzenepetroleum ether eluate. An analytical sample melted at 151–152° C. (dec.) after crystallization from benzene-hexane.

$\nu_{max.}^{CHCl_3}$ 3610, 3450 (OH), 1709 (C=O) cm$^{-1}$

*Analysis.*—Calcd. for C$_{20}$H$_{31}$BrO$_2$ (percent): C, 62.65; H, 8.16. Found (percent): C, 62.77; H, 8.16.

A subsequent preparation of the bromo compound was carried out without resorting to chromatography. 2ξ-acetyl-A-nor-5α-androstan-17β-ol (4.0 g., 13 mmoles) in 250 ml. of carbon tetrachloride underwent reaction with 4.0 g. (22 mmoles) of N-bromosuccinimide to afford, after washing with sodium bisulfite solution, 3.45 g. (86% yield) of the α-bromoketone, M.P. 140–141° C. (dec.), after crystallization from benzene-hexane.

$\nu_{max.}^{CHCl_3}$ 3610, 1709 cm$^{-1}$; $\alpha_D^{23}$ −16° (c. 0.61, CHCl$_3$).

*Part C.*—A solution of 3.1 g. (8.1 mmoles) of 2ξ-bromo-2ξ-acetyl-A-nor-5α-androstan-17β-ol, 2.0 g. of dried lithium chloride, and 50 ml. of pure, dry dimethylformamide was heated at reflux temperature for 2.5 hours, allowed to stand at room temperature overnight, and then poured into 200 ml. of water. Extraction with ether and evaporation of the dried ethereal solution gave 1.93 g. of a brown glass which was applied in benzene to 60 g. of neutral (activity III) alumina. Elution with benzene and petroleum ether gave a mixture of a saturated ketone and the desired product, 2-acetyl-A-nor-5α-androst-1-en-17β-ol, which slowly precipitated as small needles from a concentrated solution in ether-petroleum ether. The crude crystalline product weighed 0.74 (41% yield) and melted at 147.0–148.5° C. An analytical sample crystallized from acetone-petroleum ether melted at 149.0–150.5° C; $\alpha_D^{23}+72°$ (c. 2.0, CHCl$_3$).

$\nu_{max.}^{CHCl_3}$ 3650, 3497 (OH), 1664 (unsat. C=O), 1592 (C=C) cm.$^{-1}$ $\lambda_{max.}^{EtOH}$ 240 mµ (ϵ=13,000), 300 mµ (ϵ=100)

*Analysis.*—Calcd. for C$_{20}$H$_{30}$O$_2$ (percent): C, 79.42; H, 10.00. Found (percent): C, 79.49; H, 9.96.

The proton magnetic resonance spectrum (CHCl$_3$ of this compound shows the vinyl hydrogen (3.02γ) as a singlet ($\omega_{1/2}$ 3.5 cps.).

Using the procedure of Example 2 Parts A and B, with the same or different 2-aminocarbonyl steroids. (listed in column A below) and various alkylmagnesium halide, e.g., methyl-, ethyl-, propyl-, amyl-, or hexyl-magnesium bromide, other 2ξ-bromo-2ξ-acyl-A-nor-5α-androstan-17β-ols are obtained which are similarly dehydrobrominated to the Δ$^1$ steroids of column B, below, as described in Part C of Example 6.

| Column A | Column B |
| --- | --- |
| 17α-ethyl-2α-(pyrrolidinocarbonyl)-A-nor-5α-androstan-17β-ol. | 17α-ethyl-2-acetyl-A-nor-5α-androst-1-en-17β-ol. |
| 17α-vinyl-2α-(piperidinocarbonyl)-A-nor-5α-androstan-17β-ol. | 17α-vinyl-2-acetyl-A-nor-5α-androst-1-en-17β-ol. |
| 2α-(morpholinocarbonyl)-A-nor-5α-androstan-17β-ol. | 2-propionyl-A-nor-5α-androst-1-en-17β-ol. |
| 17α-ethyl-2α-(4-methylpiperidinocarbonyl)-A-nor-5α-androstan-17β-ol. | 17α-ethyl-2-butyryl-A-nor-5α-androst-1-en-17β-ol. |
| 17α-vinyl-2α-(pyrrolidinocarbonyl)-A-nor-5α-androstan-17β-ol. | 17α-vinyl-2-heptanoyl-A-nor-5α-androst-1-en-17β-ol. |
| 17α-ethynyl-2α-(pyrrolidinocarbonyl)-A-nor-5α-androstan-17β-ol. | 17α-ethynyl-2-propionyl-A-nor-5α-androst-1-en-17β-ol. |
| 2α-(pyrrolidinocarbonyl)-A-nor-5α-androstan-17β-ol. | 2-butyryl-A-nor-5α-androst-1-en-17β-ol. |
| 2α-(pyrrolidinocarbonyl)-A-nor-5α-androstan-17β-ol. | 2-hexanoyl-A-nor-5α-androst-1-en-17β-ol. |
| 2α-(pyrrolidinocarbonyl)-A-nor-5α-androstan-17β-ol. | 2-heptanoyl-A-nor-5α-androst-1-en-17β-ol. |

EXAMPLE 3

2ξ-acetyl-A-nor-5α-androstan-17-one

A solution of 0.79 g. of 2ξ-acetyl-A-nor-5α-androstan-17β-ol in 35 ml. of acetone was cooled in an ice bath and Jones reagent (chromium trioxide in water and sulfuric acid; see J. Chem. Soc. 1946, 39) was added dropwise until the color change indicated that a slight excess had been added. The mixture was stirred in the cold for 15 minutes and filtered. Dilution of the filtrate with water and extraction with ether gave, on evaporation of the ether, a glass which was purified by chromatography on 30 g. of neutral (activity III) alumina. This gave in the petroleum ether-benzene (3:1) eluate about 0.35 g. of 2ξ - acetyl - A-nor-5α-androstan-17-one. Crystallization from hexane gave an analytical sample melting at 72.5–73.5° C.; $\alpha_D^{24}+84°$ (c. 2.00, CHCl$_3$).

$\nu_{max.}^{CHCl_3}$ 1735, 1700 cm.$^{-1}$

*Anlysis.*—Calc'd for C$_{20}$H$_{20}$O$_2$ (percent): C, 79.42; H, 10.00. Found (percent). C, 79.07; H, 9.97.

In a similar manner, 2ξ-propionyl- hexanoyl- and heptanoyl-A-nor-5α-androstan-17-one are obtained from the corresponding 2ξ-acyl-A-nor-5α-androstan-17β-ols, which are prepared by the procedure described in Example 6, Part A, using the appropriate alkylmagnesium halides.

EXAMPLE 4

17α-methyl-2ξ-acetyl-A-nor-5α-androstan-17β-ol

This compound, which can also be obtained by the method described in Example 1, Part B, was prepared by the following reaction:

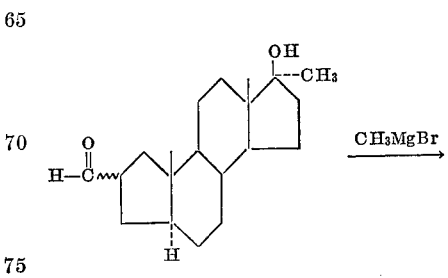

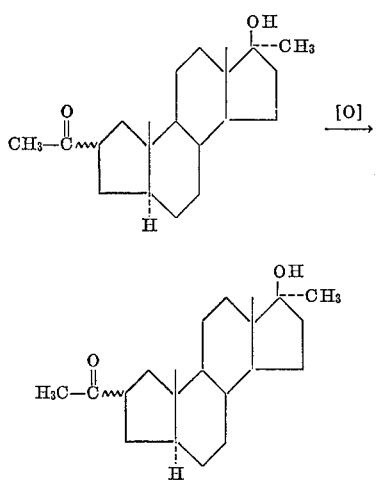

*Part A.*—A solution of 3.0 g. (10 mmoles) of 17α-methyl-2ξ-formyl-A-nor-5α-androstan-17β-ol (see Example E) in 300 ml. of benzene was distilled to remove 100 ml. of benzene. The benzene solution was cooled, 25 ml. of 3 M methylmagnesium bromide in ether was added and the mixture was heated at reflux temperature for 1 hour. The reaction mixture was cooled and poured into 500 ml. of water containing 25 g. of ammonium chloride. Separation of the benzene layer, extraction of the aqueous layer with ethyl acetate, and evaporation of the combined organic layers gave 3.20 g. of colorless glass which showed a weak band in the carbonyl region (1720 cm.$^{-1}$) of its infrared spectrum. The total crude product was dissolved in 100 ml. of tetrahydrofuran and again treated with 15 ml. of 3 M methylmagnesium bromide in ether. The mixture was distilled to remove 50 ml. of distillate and then heated at reflux temperature for 1 hour, after which time an additional 70 ml. of distillate was removed. The reaction mixture was then worked up as above. A 1.0-g. portion of the crude 17α-methyl-2ξ-(1′-hydroxyethyl)-A-nor-5α-androstan-17β-ol was chromatographed on 30 g. of neutral (activity III) alumina to give in the benzene eluate about 0.5 g. of colorless glass having an infrared spectrum in agreement with the assigned structure. The product, probably a mixture of four diastereoisomers, was used directly in the subsequent reaction.

*Part B.*—A solution of 3.0 g. of the product of Part A in 10 ml. of pyridine was added to a solution of 3.0 g. of chromium trioxide in 50 ml. of pyridine. The mixture was stirred at room temperature for 3 days and then poured into 250 ml. of water containing 250 g. of dibasic sodium phosphate. The brown mixture was filtered and the filtrate extracted with ethyl acetate. The brown filter cake was washed with hot ethyl acetate and the combined ethyl acetate solutions were washed with 5% aqueous hydrochloric acid, dried, and evaporated in vacuo. The residue, weighing 2.03 g., was applied in benzene to a column of 200 g. of neutral (activity III) alumina. Elution with benzene gave 1.22 g. of a mixture of C-2 epimeric 17α-methyl-2-acetyl-A-nor-5α-androstan-17β-ols. Crystallization from acetone-hexane gave as the first crop 743 mg., M.P. 109.2–111.0° C.; as the second crop 143 mg., M.P. 92.2–105.0° C.; and as the third crop 20 mg. M.P. 146.5–149.0° C. All three fractions had $\nu_{max.}^{CHCl_3}$ 3550, 3400 (OH), 1692 (C=O) cm.$^{-1}$ The first fraction was chosen for analysis; $\alpha D^{24} -8°$ (c. 0.5, CHCl$_3$).

*Analysis.*—Calcd. for C$_{21}$H$_{34}$O$_2$ (percent): C, 79.19; H, 10.76. Found (percent): C, 79.21; H, 10.66.

Applying the same procedure to the 2-formyl steriods of column A (obtainable by the general method of Examples E) and to the appropriate alkylmagnesium halide affords the products of column B.

| Column A | Column B |
|---|---|
| 17α-ethyl-2ξ-formyl-A-nor-5α-androstan-17β-ol. | 17α-ethyl-2ξ-pentanoyl-A-nor-5α-androstan-17β-ol. |
| 17α-ethynyl-2ξ-formyl-A-nor-5α-androstan-17β-ol. | 17α-ethynyl-2ξ-propionyl-A-nor-5α-androstan-17β-ol. |
| 17α-vinyl-2ξ-formyl-A-nor-5α-androstan-17β-ol. | 17α-vinyl-2ξ-acetyl-A-nor-5α-androstan-17β-ol. |

EXAMPLE 5

17α-methyl-2-acetyl-A-nor-5α-androst-1-en-17β-ol

This product was obtained by a reaction similar to that described in Example 4 except that the oxidizing agent used in the second step was 2,3-dichloro-5,6-dicyano-p-benzoquinone.

*Part A.*—To a solution of 0.86 g. of 17α-methyl-2-formyl-A-nor-5α-androst-1-en-17β-ol (see Example G) in 40 ml. of dry benzene was added 4 ml. of 3 M methylmagnesium bromide in ether and the mixture was heated at reflux temperature for 1 hour. The reaction mixture was poured into 100 ml. of 10% ammonium chloride solution and extracted with ethyl acetate. Evaporation of the solvent and crystallization of the residue from acetone gave 600 mg. of 17α-methyl-2-(1′-hydroxyethyl)-A-nor-5α-androst-1-en-17β-ol M.P. 174–176° C.

*Analysis.*—Calcd. for C$_{20}$H$_{34}$O$_2$ (percent): C, 79.19; H, 10.76. Found (percent): C, 19.02; H, 10.58.

The same product can also be obtained by reaction of methylmagnesium bromide with 2 - formyl - A-nor-5α-androst-1-en-17-one (see Example H).

*Part B.*—A solution of 0.10 g. of 17α-methyl-2-(1′-hydroxy-ethyl)-A-nor-5α-androst-1-en-17β-ol and 0.10 g. of 2,3-dichloro-5,6-dicyano-p-benzoquinone in 10 ml. of benzene was stirred at room temperature for about 17 hours. The reaction mixture was diluted with 10 ml. of ether and filtered. The filtrate was washed with three 10-ml. portions of 5% aqueous sodium bicarbonate, dried over sodium sulfate, and evaporated in vacuo, affording 0.098 g. of 17α-methyl-2-acetyl-A-nor-5α-androst-1-en-17β-ol- M.P. 140–141° C.;

$\nu_{max.}^{CHCl_3}$ 3600, 3450 (OH), 1660 (doublet)

(conjugated C=O), 1588 (conjugated C=C) cm$^{-1}$

This product (as obtained in another preparation) gave the following elemental analysis:

*Analysis.*—Calcd. for C$_{21}$H$_{32}$O$_2$ (percent): C, 79.70; H, 10.19. Found (percent): C, 79.52; H, 10.22.

In like manner, reaction of the appropriate alkylmagnesium halide with the 2-formyl-A-nor-5α-androst-1-enes of column A (obtainable by the general method of Examples F and G) gives the corresponding 2-(1′-hydroxyalkyl) steriods which, on oxidation, give the 2-acyl steroids of column B.

| Column A | Column B |
|---|---|
| 2-formyl-A-androst-1-en-17β-ol | 2-acetyl-A-nor-5α-androst-1-en-17β-ol. |
| 17α-ethyl-2-formyl-A-nor-5α-androst-1-en-17β-ol. | 17α-ethyl-2-butyryl-A-nor-5α-androst-1-en-17β-lo. |
| 17α-vinyl-2-formyl-A-nor-5α-androst-1-en-17β-ol. | 17α-vinyl-2-(heptanoyl)-A-nor-5α-androst-1-en-17β-ol. |
| 17α-ethynyl-2-formyl-A-nor-5α-androst-1-en-17β-ol. | 17α-ethynyl-2-(propionyl)-A-nor-5α-androst-1-en-17β-ol. |

EXAMPLE 6

17α-ethynyl-2-acetyl-A-nor-5α-androst-1-en-17β-ol

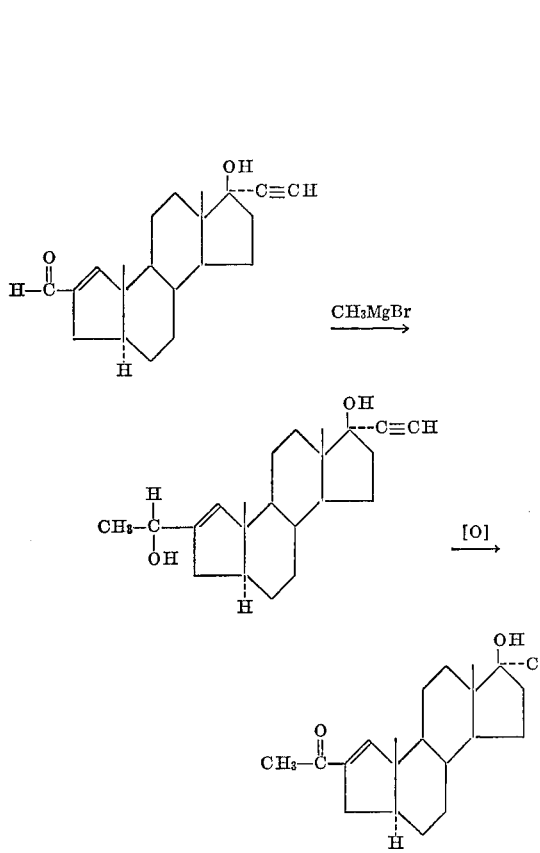

*Part A.*—To 4.6 g. of 17α-*ethynyl*-2-formyl-A-nor-5α-androst-1-en-17β-ol (see Example L) in 350 ml. of dry tetrahydrofuran was added 25 ml. of 3 M methylmagnesium bromide, and the mixture was heated at reflux under nitrogen for one hour. After removing 150 ml. of solvent by distillation, the reaction mixture was cooled and poured into 500 ml. of water containing 50 g. of ammonium chloride. Extraction with ether gave, on evaporation of the ether, a crude product which was chromatographed on 180 g. of neutral, activity III alumina. Elution with benzene-ethyl acetate (3:1) gave 4.6 g. of 17α - ethynyl - 2 - (1' - hydroxyethyl)-A-nor-5α-androst-1-en-17β-ol;

$\nu_{max.}^{CHCl_3}$ 3330 cm.$^{-1}$(—C≡CH)

*Part B.*—A solution of the above product (4.6 g.) in 25 ml. of pyridine was added to a solution of 4.5 g. of chromium trioxide in 70 ml. of pyridine at 15–25° C. After being stirred at room temperature for 24 hours. the reaction mixture was filtered and the filter cake and filtrate were extracted with ether. The combined ether extracts were washed with water and, after drying, the ether solution was evaporated to give 2.8 g. of 17α-ethynyl - 2 - acetyl - A - nor - 5α-androst-1-en-17β-ol as a glassy solid. After chromatography on neutral, activity III alumina, the infrared spectrum of the product showed $\nu_{max.}^{CHCl_3}$ 3330 (—C≡CH), 1665 (conj. —C=O) and 1590 (conj. C=C) cm.$^{-1}$

EXAMPLE 7

2-benzoyl-A-nor-5α-androst-1-en-17β-ol

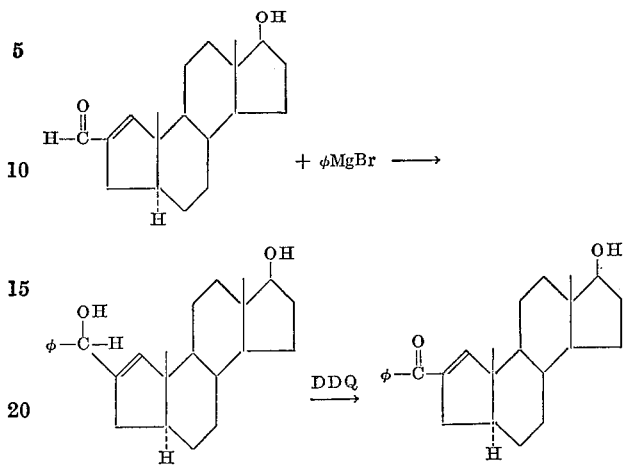

A solution of 1.0 g. of 2-formyl-A-nor-5α-androst-1-en-17β-ol (see Example D) in 150 ml. of benzene was distilled to remove 25 ml. of solvent. The solution was cooled to room temperature and 10 ml. of 3 M phenyl magnesium bromide in ether was added. The reaction mixture was then heated at reflux temperature for 7 hours, cooled, poured into water containing ammonium chloride and extracted with ethyl acetate. The ethyl acetate was washed with water, dried, and evaporated to give a semisolid which crystallized from acetone-hexane thereby affording 0.9 g. of diol, M.P. 215–219°. A solution of 0.9 g. of the diol and 0.9 g. of 2,3-dichloro-5,6-dicyano-1,4-benzoquinone in 50 ml. of dioxane was stirred for 4 days at room temperature, diluted with 200 ml. of ether and filtered. The filtrate was washed with water and with 5% aqueous sodium bicarbonate. Evaporation of the solvent and chromatography of the residue on 50 g. of neutral activity grade III alumina gave in the benzene eluent 0.80 g. of 2-benzoyl-A-nor-5α-androst-1-en-17β-ol, colorless needles, M.P. 171.5–172.5°, [α]$_D$ +121° (c.=0.85, CHCl$_3$), λ$_{max.}$ (EtOH) 253 mμ (ε14,700; $\nu_{max.}$ (CHCl$_3$) 16455, 1608, 1585 cm.$^{-1}$; n.m.r. (CDCl$_3$) 7.3–7.8 p.p.m. (phenyl), 6.7 p.p.m. (vinyl).

*Analysis.*—Calcd. for C$_{25}$H$_{32}$O$_2$ (percent): C, 82.37; H, 8.85. Found (percent): C, 82.06; H, 9.12.

EXAMPLE 8

2-benzoyl-A-nor-5α-androst-1-en-17β-ol propionate

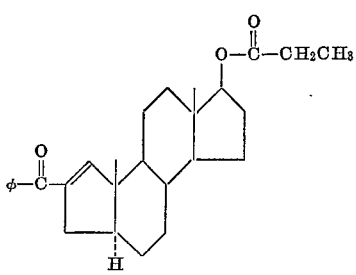

Propionic anhydride (1.0 ml.) was added to a solution of 0.60 g. of the 17β-ol of Example 7 in 7 ml. of pyridine. The mixture remained at room temperature overnight and was then poured into 100 ml. of water. After being stirred for 0.5 hr., the aqueous mixture was extracted with ether, washed with 5% HCl, dried, and evaporated giving 0.8 g. of a glassy material which was chromatographed on 50 g. of neutral activity grade III alumina. Elution with petroleum ether-benzene (1:1 by vol.) and crystallization from hexane gave 0.55 g. of crystalline 2 - benzoyl-A-nor-5α-androst-1-en-17β-ol propionate, M.P. 146–147°; λ$_{max.}$(EtOH) 253 mμ(ε 14,800).

*Analysis.*—Calcd. for $C_{28}H_{36}O_3$ (percent): C, 79.96; H, 8.63. Found (percent): C, 80.26; H, 8.61.

In a procedure analogous to that of Example 7, other 2-aroyl-A-nor-5α-androst-1-en-17β-ols can be prepared by using the appropriate arylmagnesium halide Grignard reagents, for example, compounds of the type

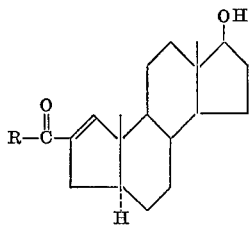

may be prepared from RMgX, where RMgX is

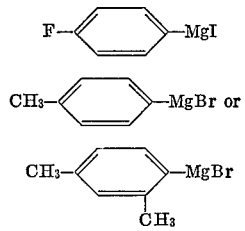

Other esters analogous to the propionate ester of Example 8 can be prepared from the appropriate anhydrides, e.g., from valeryl anhydride.

EXAMPLE 9

2-acetyl-A-nor-5α-androst-1-en-17β-ol propionate

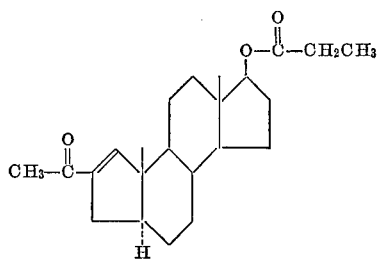

One gram of 2-acetyl-A-nor-5α-androst-1-en-17β-ol (see Example 2) in 10 ml. of pyridine was treated with 1.0 ml. of propionic anhydride for 24 hrs. at room temperature. The reaction product was poured into water, extracted with ethyl acetate, washed, dried and evaporated to dryness. Elution from a column of 40 g. of neutral activity grade III alumina with 1:1 (by vol.) benzene-petroleum ether gave, on crystallization from acetone-hexane, 0.76 g. of propionate ester, M.P. 87–92°; $[\alpha]_D+50°$ (c.=0.3, $CHCl_3$), $\lambda_{max.}(CHCl_3)$ 5.78, 6.02, 6.28μ; $\lambda_{max.}(EtOH$ 240 M (ε 13,000).

*Analysis.*—Calcd. for $C_{23}H_{34}O_3$ (percent): C, 77.05; H, 9.56, Found (percent): C, 76.92; H, 9.92.

2-acetyl-A-nor-5α-androst-1-en-17β-ol can be converted into other esters by analogous procedures using conventional anhydrides such as acetic anhydride, valeryl anhydride, etc.

Tests on experimental animals show that the compounds of this invention possess useful biological properties such as antifertility, anabolic or antigonadotrophic activity.

For example, 17α - ethynyl-2ξ-acetyl-A-nor-5α-androstan-17β-ol (the compound of Example 1) prevented pregnancies when administered subcutaneously at the rate of 2.5 mg./day for 12 days to female rats which were mated with fertile males. When this compound was administered subcutaneously to male rats at the rate of 1.0 mg./day for 14 days it showed antigonadotrophism.

2-acetyl-A-nor-5α-androst-1-en-17β-ol (the compound of Example 2) prevented pregnancies when administered subcutaneously at the rate of 2.5 mg./day for 12 days to female rats which were mated with fertile males.

17α - methyl - 2-acetyl-A-nor-5α-androst-1-en-17β-ol (entry 1 under column B of Example 2) in a modified Hershberger androgenic-anabolic assay proved to be one-half as potent as methyltestosterone as an androgen but eight times as potent as methyltestosterone as an anabolic agent when the compounds are administered orally. This means that 17α - methyl-2-acetyl-A-nor-5α-androst-1-en-17β-ol shows a more desirable ratio of anabolic to androgenic activity than does methyltestosterone by a factor of 16.

Under analogous test conditions 2-propionyl-A-nor-5α-androst-1-en-17β-ol (entry 4 under column B of Example 2) proved to be 0.05 as potent as testosterone as an androgen but 0.2 as potent as testosterone as an anabolic agent when both compounds are administered by subcutaneous injection. This means that 2-propionyl-A-nor-5α-androst-1-en-17β-ol shows a more desirable ratio of anabolic to androgenic activity than does testosterone by a factor of 4.

The compounds of Examples 7 and 8 exhibited antiandrogenic activity in castrate rats treated with testosterone or testosterone propionate.

The compound of Example 9 exhibited androgenic and anabolic activity in rats.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

What is claimed is:

1. Steroids selected from the class consisting of (I)

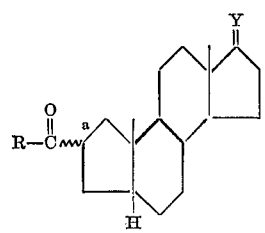

wherein *a* is a single bond or a double bond between carbons 1 and 2; Y is =O or the group

$R^1$ being $CH_3$, $C_2H_5$, $CH=CH_2$ or $C\equiv CH$; provided that when *a* is a single bond, $R^1$ cannot be $CH_3$; and (II)

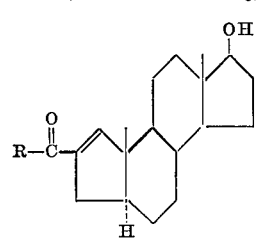

R in each instance being fluorophenyl, phenyl or alkylphenyl of up to 8 carbon atoms, or alkyl of 1 through 6 carbon atoms and 17β-propionates of the steroids formula.

2. The steroids of claim 1 of the formula

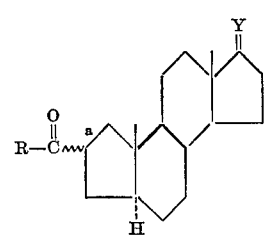

wherein Y, *a* and R are as defined in claim 1.

3. The steroids of claim 1 of the formula

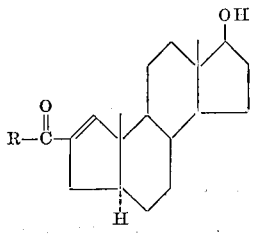

wherein R is defined as in claim 1.

4. The steroid of claim 1 of the chemical name 17α-ethynyl-2-acetyl-A-nor-5α-androstan-17β-ol.

5. The steroid of claim 1 of the chemical name 2-acetyl-A-nor-5α-androst-1-en-17β-ol.

6. The steroid of claim 1 of the chemical name 17α-methyl-2-acetyl-A-nor-5α-androst-1-en-17β-ol.

7. The steroid of claim 1 of the chemical name 17α-ethynyl-2-acetyl-A-nor-5α-androst-1-en-17β-ol.

8. The steroid of claim 1 of the chemical name 2-benzoyl-A-nor-5α-androst-1-en-17β-ol.

9. The steroid of claim 1 of the chemical name 2-benzoyl-A-nor-5α-androst-1-en-17β-ol propionate.

10. The steroid of claim 1 of the chemical name 2-acetyl-A-nor-5α-androst-1-en-17β-ol propionate.

References Cited

UNITED STATES PATENTS

| | | | |
|---|---|---|---|
| 2,228,577 | 1/1941 | Marker | 260—586 |
| 3,236,880 | 2/1966 | Berk et al. | 260—488 |
| 3,367,963 | 2/1968 | Levine et al. | 260—488 |
| 3,426,045 | 2/1969 | Diassi | 260—488 |

OTHER REFERENCES

A. Castres De Paulet et al.: Bull. Soc. Chim., 1960, 599.

M. Mousseron et al.: C. R. Acad. Sci. 1958, 2200–02 (referred to in the De Paulet et al. reference cited above).

LORRAINE A. WEINBERGER, Primary Examiner

V. GARNER, Assistant Examiner

U.S. Cl. X.R.

260—247.7, 294.7, 326.5, 340.9, 586, 590, 617; 424—311, 331